United States Patent [19]

Lynch

[11] Patent Number: 4,648,625

[45] Date of Patent: Mar. 10, 1987

[54] SEAT BELT TENSION RELIEF DEVICE

[76] Inventor: James P. B. Lynch, No. 1, Hartshorn La., West Nyack, N.Y. 10994

[21] Appl. No.: 749,672

[22] Filed: Jun. 28, 1985

[51] Int. Cl.⁴ .............................................. B60R 22/00
[52] U.S. Cl. ................................................... 280/808
[58] Field of Search ................ 280/801, 802, 804, 808

[56] References Cited

U.S. PATENT DOCUMENTS

| | | | |
|---|---|---|---|
| 3,856,327 | 12/1974 | Otani | 280/802 |
| 3,958,812 | 5/1976 | Satzinger | 280/808 |
| 4,056,271 | 11/1977 | Imabushi | 280/808 |
| 4,072,323 | 2/1978 | Shimokawa | 280/804 |
| 4,292,932 | 10/1981 | Wooderson | 280/801 |
| 4,315,638 | 2/1982 | Takada | 280/804 |
| 4,336,957 | 6/1982 | Schultz | 280/804 |

Primary Examiner—John J. Love
Assistant Examiner—Everett G. Diederiks, Jr.
Attorney, Agent, or Firm—Marvin Feldman

[57] ABSTRACT

A seat belt tension relief device is formed with an elastic self-retracting member which at one end is pivotally mounted adjacent the door frame while at the other end adjustably engages the torso engaging portion of the seat belt. The length of the elastic self-retracting member, as well as the strap engaging end portion, are readily adjustable to the comfort of the user. When not in use the device is adjustably mounted parallel to and along the door frame. The device is designed to be economically retrofitted in automobiles with spring-loaded seat belts.

9 Claims, 7 Drawing Figures

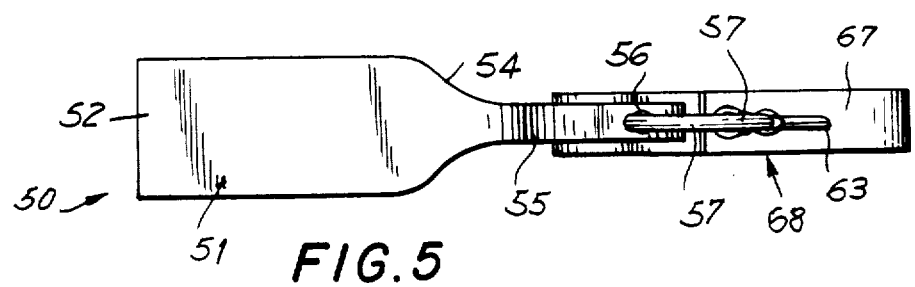
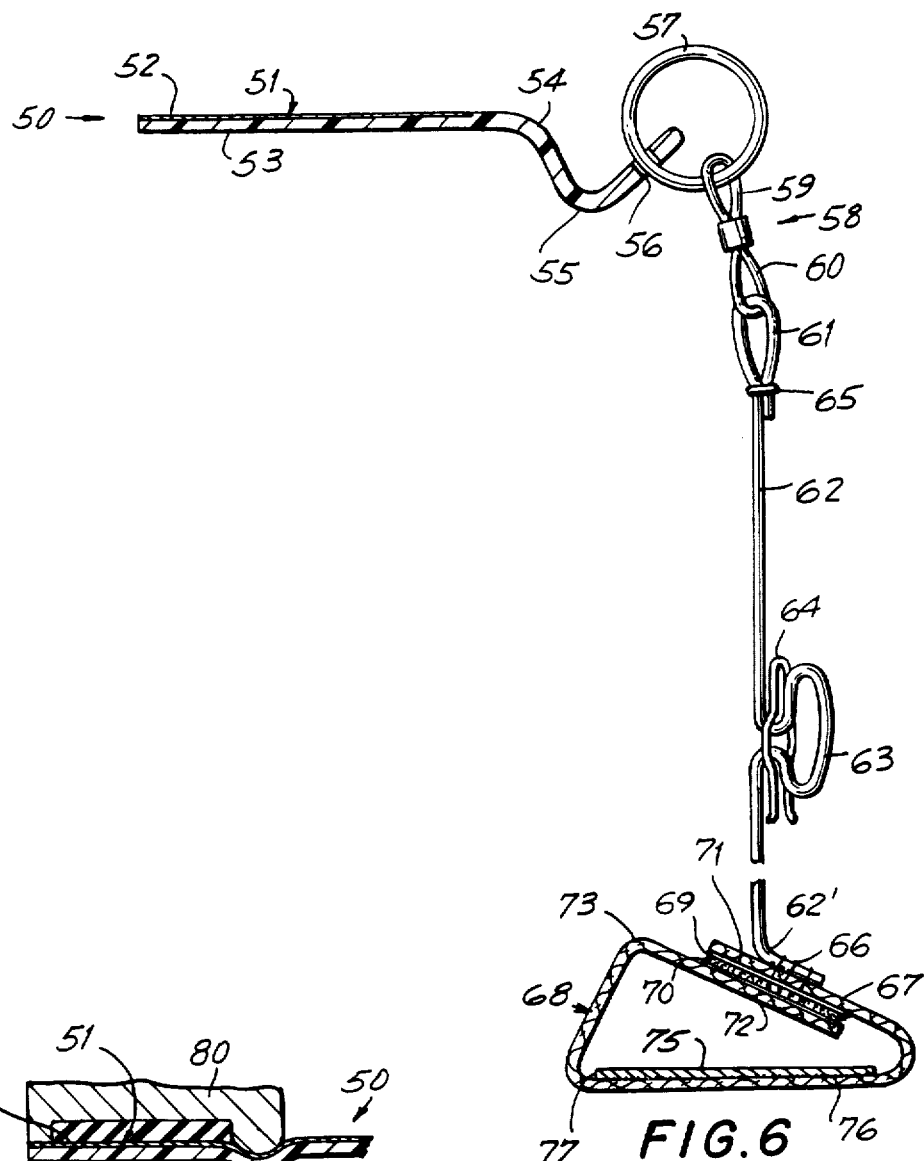
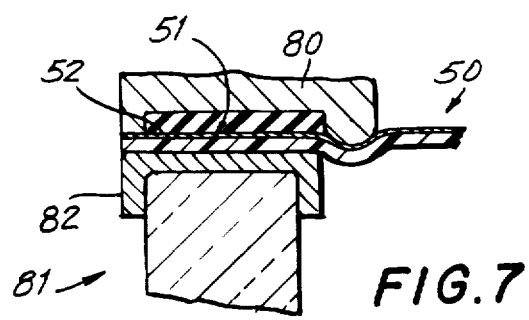

SEAT BELT TENSION RELIEF DEVICE

FIELD OF THE INVENTION

This invention relates to a device for attachment to motor vehicle safety seat belts. More specifically this invention relates to a device for relieving the tension of the seat belt on the user.

BACKGROUND AND DISCUSSION OF THE PRIOR ART

In connection with the safety seat belts known today, one end of the belt is permanently retained by a spring-loaded roller in a wound and strained position in a way such that with slow pullout motions of the seat belt, the seat belt is fastened and the occupant is held by the belt against the force of the spring. When a sudden motion occurs, that is by high accelerations, the seat belt is blocked by the spring due to the mass moment of inertia as it may occur, for example, when the vehicle is suddenly retarded due to contact with an obstacle or another vehicle and the belt is retained at its two ends, permitting the spring to perform the retaining function it is expected to perform.

Normally, the seat belts are currently fitted by the automobile manufacturers and mounted in different ways. The use of said belts, which are permanently under spring tension, is considered an inconvenience in many cases particularly because the belt is placed across the torso or upper part of the chest, thus causing many drivers to have a feeling of being constricted in an unpleasant way.

The prior art sought an additional attachment for motor vehicles which attachment made it possible to loosen the initial stress exerted on the belt by the spring, so that the user is not constricted by the belt pressure.

Typical prior art devices are disclosed in U.S. Pat. No. 4,297,467 granted Oct. 13, 1981 to Frantom and U.S. Pat. No. 4,484,766 granted Nov. 27, 1984 to Buchmeier. Those devices required the manufacture, assembly and mounting of several specially machined interfitting metal members. This was a costly solution to the problem of seat belt strain relief, and which engendered unwieldy installation, and provided the undesirable addition of metal frame members mounted on the inside of the automobile adjacent the driver and passengers.

Now there is provided by the present invention a readily retrofitted and universally adaptable seat belt tension relief device which eliminates the aforesaid prior art problems associated with specially machined interfitting metal members.

SUMMARY OF THE INVENTION

A seat belt tension relief device is formed with an adjustable length elastic member which at one end is pivotally mounted adjacent the door frame while at the other end is formed with a flexible adjustable member which encompasses the seat belt at the portion of the user's torso. The device is substantially of flexible material construction. When not in use the device is readily removed or stowed.

In use, the device portion which encompasses the seat belt readily disengages from the seat belt under high accelerations so that the seat belt holds in its intended fashion.

BRIEF DESCRIPTION OF THE DRAWINGS

FIG. 5 is a plan partial fragmentary view of another embodiment of the invention;

FIG. 6 is a sectional side view of the embodiment of FIG. 5; and

FIG. 7 is a sectional partial fragmentary view of the embodiment of FIG. 5, in actual use wedged between the door frame and auto frame.

DESCRIPTION OF THE PREFERRED EMBODIMENTS

Figure 1:
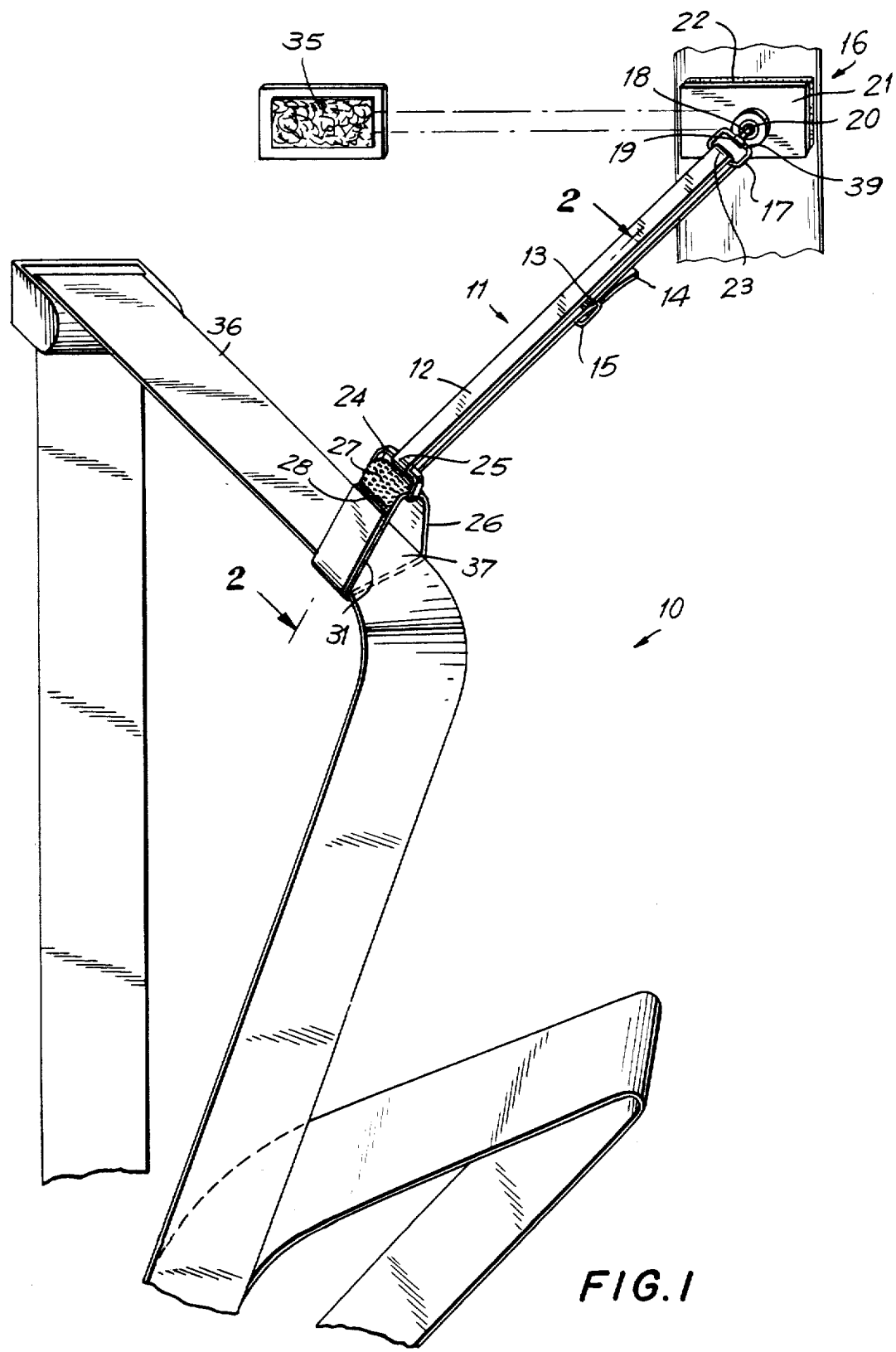
FIG. 1 is a perspective view of the invention in actual use, with the stowed disposition being shown in phantom line.
Figure 2:
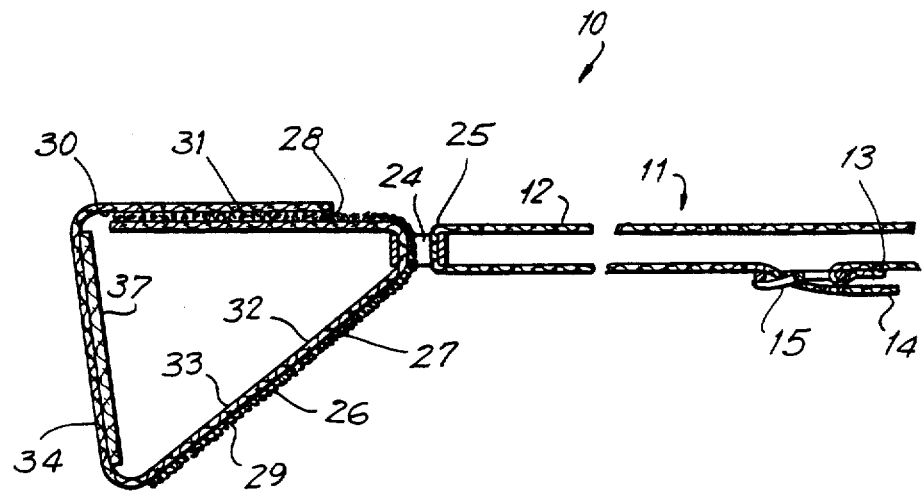
FIG. 2 is an enlarged fragmentary sectional view taken along line 2—2 of FIG. 1.
Figure 3:
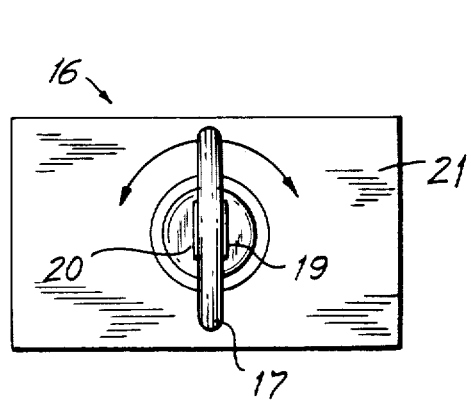
FIG. 3 is a plan view of the pivotal mounting member.
Figure 4:
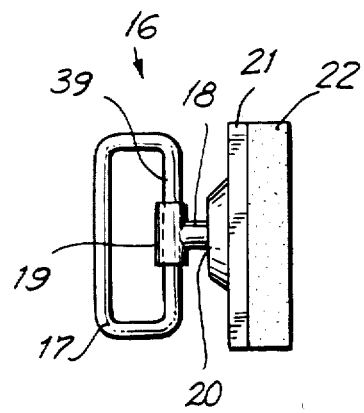
FIG. 4 is a side elevational view of the pivotal mounting member of FIG. 3.

Referring to the FIGURES there is shown the seat belt tension relief device of the present invention generally referred to as 10. Device 10 comprises an elastic member or belt 11 being formed as an elongated loop 12. Ends 13 and 14 of belt 11 are respectively, fixedly mounted and adjustably mounted, to conventional adjustable belt buckle 15 for adjusting the length of the belt 11 and in turn loop 12.

Door mount assembly 16 is formed of a rigid metal rectilinear link element 17, a post 18 rotatably holding link leg 39 of element 17, at 19, and a pivot 20 formed with post 18. Pivot 20 is of well known construction and is mounted in base mounting member 21 for the free rotation of the pivot 20, and in turn, post 18 and element 17. Pivot 20 may be of ball joint construction. Base member 21 is affixedly attached to a compressible plastic mount member 22 by adhesive or other suitable means. Members 21 and 22 are affixed above the door frame by suitable means well known in the art including permanent adhesives and other well known means.

Belt 11 engages element 17 at belt portion 23 for purposes hereinafter appearing. Rectilinear metal link or loop 24 engages belt 11 at opposite portion 25. A band of flexible material or fabric 26 is affixedly covered with Velcro strip 27 and pad 28 on opposite band faces 29 and 30, respectively. Velcro strip 27 and Velcro pad 28 interengage at portion 31. Velcro strip 27 is formed of the multiple plastic looped Velcro elements and the pad 28 is formed of tufted Velcro material. Portion 32 is impregnated with stiffening adhesive or resin impregnated in a portion of the band so as to form a semi-flexible leg 33 of otherwise flexible triangular loop 34.

A tufted Velcro pad 35 is adhesively mounted above the inside door frame for purposes hereinafter appearing.

A conventional spring-loaded seat belt 36 is shown with torso engaging portion 37.

In operation, the user wears seat belt 36, and pulls band 26 around belt portion 37 and engages pad 28 with strip 27 to form the triangular loop or alternatively pulls the seat belt 36 through the pre-formed triangular loop 34. The elastic member 11 holds the seat belt and elastically pulls belt portion 37 away from the user's torso thereby providing the desired relief. Buckle 15 may be adjusted to provide the desired degree of relief of belt portion 37 away from the torso of the wearer. When the user is exiting from the car, seat belt 36 is released and passed through triangular loop 34 or loop 34 is opened. Strip 27 is then attached to pad 35 so that the device is stowed away directly above and parallel to the door frame (see phantom line of FIG. 1).

It is understood that mounting pad 35 and base mounting member 21 may be mounted to the inside of the car above, adjacent or on the door frame by one of several well known means. It is also within the contemplation of the invention to provide non-permanent mounting means such as with magnetic members, and the like.

Under high acceleration, the seat belt pulls towards the user, and this force is sufficient to overcome the Velcro holding force of the triangular loop so as to disengage the Velcro pads and "knock down" the triangular loop, thus permitting the seat belt to hold the user in its intended manner.

Referring now to FIGS. 5–7 there is shown alternate embodiment generally referred to as 50. Device 50 is formed of a thin normally flat flexible card 51 formed with a top flexible magnetic portion 52 and a coextensive flat flexible plastic portion 53 integrally bonded therewith. Portion 53 tapers at 54 to form a v-shaped cylindrical plate extension portion 55. Portion 55 is formed with through hole 56. Metal ring 57 slidably moves in hole 56. A swivel member 58 of conventional construction is formed with oppositely disposed loops 59 and 60. Loop 59 is engaged by ring 57, while loop 60 is engaged by end 61 of cylindrical, flexible, and elastically retractably extensible member or cord 62. End 61 is permanently held by stitching 65. Cord 62 may be adjustably looped as at 63 through and with adjustment retaining member 64 of well known construction, to adjust the length of cord 62.

End 62' of cord 62 is stitched at 66 to side 67 of flat flexible fabric piece 68. Fabric piece 68 is of similar size and shape to fabric piece 26 heretofore described. Opposed interengaging Velcro pads 69 and 70 are affixedly mounted to sides 71 and 72 of fabric piece 68, so that when pads 69 and 70 are engaged a triangular loop 73 is formed. A stiff cardboard plate 75 is adhesively secured at 76 to portion 77 of fabric piece 68 to ensure the integrity of the triangular loop 73 with the Velcro pads 69 and 70 interengaged.

A seat belt (not shown in FIGS. 5–7) passes through and resides in triangular loop 73 in a manner similar to that heretofore discussed in relation to the first described embodiment.

In use, flexible card 51 is placed with magnetic face 52 upwardly against the underside of automobile frame 80 at the door portion. Card is magnetically held in place with the door 81 open. The door 81 and specifically top door frame 82 is closed so as to wedge flexible card 51 between the automobile frame 80 and the door frame 82. The device is then used in a manner similar to that previously described.

The device 50 is disengaged by opening the triangular loop 73 and then opening the car door while holding card 51.

In this manner of construction device 50 may be readily used and removed without providing permanently mounted elements in the automobile.

It is to be understood that variations and modifications of the present invention may be made without departing from the scope thereof. It is also to be understood that the present invention is not to be limited by the specific embodiments disclosed herein but only in accordance with the appended claims when read in light of the foregoing specification.

What is claimed is:

1. A seat belt tension relief device for a vehicle seat belt having a passenger torso engaging portion comprising: an elongated elastic member, means pivotally mounting one end of said elastic member to a vehicle frame member and a means attached to the other end to engage the torso engaging portion of the seat belt, said means to engage comprising a flexible member in the form of a band having first and second Velcro strips attached at respective opposite sides and ends of the band, said means to engage further including a stiffened plate bonded to one side of the band intermediate the two ends of the band, wherein when the flexible member is placed around the seat belt and the Velcro strips are engaged, the flexible member takes the form of a triangular loop with the stiffened plate defining one side of the triangle, the torso engaging portion of the seat belt engages the stiffened plate, and wherein the flexible member is attached to said elastic member opposite the side defined by the stiffened plate, whereby the device elastically holds the seat belt above the wearer and relieves the strain of the seat belt on the torso of the wearer.

2. The device of claim 1, said pivotally mounting means comprising a rigid link element and means to pivot said link element, and means to affixedly mount said pivotally mounting means adjacent the top of the automobile door frame.

3. The device of claim 1, said elastic member comprising means to adjust the length of said member.

4. The device of claim 1, further comprising a rigid link interconnecting said flexible material loop and said elastic member.

5. The device of claim 4, wherein the elastic member is formed as a belt and further comprising an adjustable buckle being mounted on said belt.

6. The device of claim 1, said pivotally mounting means comprising a link element and means to pivot said element, and means to affixedly mount said pivotally mounting means adjacent the top of the automobile door frame.

7. The device of claim 1, futher comprising a third Velcro strip, and means to mount said third Velcro strip to the interior of the automobile adjacent the door frame, whereby with the seat belt disengaged the first Velcro strip of the band engages the third Velcro strip so as stow the device when not in use.

8. The device of claim 1, wherein the elastic member is an elastic cord.

9. The device of claim 1, wherein the means pivotally mounting one end of said elastic member to a vehicle frame member includes a card means, said card means being disposed between the automobile frame and a vehicle door frame.

* * * * *